Patented Nov. 1, 1932

1,885,141

UNITED STATES PATENT OFFICE

ARTHUR B. RAY, OF BAYSIDE, NEW YORK, ASSIGNOR TO CARBIDE & CARBON CHEMICALS CORP., A CORPORATION OF NEW YORK

PROCESS OF MAKING ABSORPTIVE CARBON AND PRODUCT THEREOF

No Drawing. Application filed May 25, 1927, Serial No. 194,235. Renewed September 17, 1931.

The object of this invention is to provide a novel process of making activated carbon of the absorptive type, and a novel product resulting from said process.

Activated carbon suitable for absorption of gases and vapors has heretofore been prepared by subjecting certain dense forms of carbon, and more especially charcoals derived from cocoanut and other nut shells, to selective oxidation, usually by steam, at temperatures upward of 800° C., the conditions being so controlled as substantially to eliminate the contained hydrocarbons, and to impart to the product the desired degree of porosity. Absorptive carbons having a lesser degree of activity have also been prepared by an essentially similar treatment of granular or briquetted anthracitic coals.

Absorptive carbons have likewise been made by the so-called impregnation process, according to which peat or other cellulosic material is impregnated with dehydrating agents such as zinc chlorid, phosphoric acid, etc., and molded aggregates therefrom are heated to an appropriate temperature.

According to the present invention absorbent carbons possessing a high degree of activity coupled with great strength, density and hardness are obtained from certain coals of bituminous or sub-bituminous character, and geologically older than the lignites. So far as I am aware this result has not before been achieved. In certain of its aspects the process is likewise applicable to the treatment of lignites, as hereinafter explained.

In order to be suitable for use in accordance with the present process, the coals chosen must be free from any marked or substantial tendency to "coke" or swell when heated in absence of air; or if such tendency exists to any material extent the process must be appropriately modified to impart to the coals the necessary "non-coking" character.

The coking quality commonly possessed by bituminous coals is less dependent upon the quantity of bituminous matter present than upon its nature, concerning which however from the point of view of chemical constitution practically nothing is definitely known. It is well known however that most bituminous coals when heated without access of air, swell, lose volatile matter, and ultimately harden into a highly porous or cellular product or coke. On the other hand certain coals, although having a like or even greater content of volatile matter, lose this when subjected to destructive distillation without swelling and coking as above described. Such coals, designated hereinafter simply as "non-coking coals" and typified by the non-coking coal deposits of Utah and Wyoming are suitable for use in accordance with the present process without further treatment, or with minimum further treatment.

Other coals possessing more or less marked coking qualities require a preliminary treatment to render them substantially non-coking. Such treatment may involve subjection at relatively low temperatures, say 200°–300° C. and for comparatively long periods to oxidizing conditions, as by heating in presence of air, or other oxidizing environment; or treatment with solvents or oxidizing agents. Thereby normally coking coals may be rendered substantially non-coking and adapted for use in accordance with this invention. Accordingly the expression "non-coking coal" is used in the appended claims to designate either bituminous or sub-bituminous coals which are naturally substantially non-coking or which have been rendered so by appropriate treatment. Such treatment may either precede the activating process or may constitute a part of such process.

According to this invention the non-coking coal is treated by the impregnation process, the preferred impregnating agent being zinc chlorid, although phosphoric acid, potassium sulfid and the like may be used. These agents possess in common the property of inducing carbonization at lower temperatures or in shorter times than would otherwise occur, and will therefore be simply designated as "carbonizing agents." Preferred operating conditions will now be described:

1—Non-coking coals, if available, may be used without pre-treatment. In case of coking coals, the coking or swelling properties should be reduced or destroyed by appropriate treatment, such as extraction of bituminous matter by solvents (benzene, xylene, pyridin, phenol, alkali solutions, etc.); subjection to oxidants such as nitric or sulfuric acid or chlorin in presence of moisture; steaming; or by heating in presence of air at temperatures below the melting point of the bitumen. This last mentioned method has been found particularly effective with coals from the mid-continent field. This heating may either precede or follow the impregnation of the coal with zinc chlorid or other agent. The procedure to be chosen will depend upon the characteristics of the particular coal treated.

2—For gas-absorptive purposes a granular carbon, say 6–20 mesh is usually desired. The coal may be directly crushed and screened to a size slightly in excess of that desired, and the resulting granules impregnated, or the finely powdered coal may be impregnated to form a heavy paste, which is then briquetted, calcined and crushed to size; or extruded, calcined, and crushed and sized as required. In either case the impregnation is carried out by thoroughly soaking the coal particles in (preferably) an aqueous solution of the impregnating agent, and heating to substantial dryness. The nature of the final product will depend in large measure upon the kind and amount of impregnating or carbonizing agent used. Excellent results have been obtained with zinc chlorid in amount about equal to the weight of coal treated, and dissolved in just sufficient water to cover the coal. However other agents, as phosphoric acid and potassium sulfid, may be similarly used with good results.

In case greater plasticity is desired in order that the mass may be readily extruded, sufficient tar, glucose or equivalent material is incorporated into the mixture to accomplish this result.

3—In the case of non-coking coals, or coals already treated to reduce their coking tendency to the required degree, the impregnation is carried out as described, and the product is calcined at a high temperature with substantial exclusion of oxygen, in case zinc chlorid or potassium sulfid is used as the carbonizing agent, or optionally in presence of some oxygen if phosphoric acid is used, since thereby the toxic hazard is lessened. This calcination may be carried out in various ways, as for example in an internally fired rotating drum in presence of hot combustion gases; in an externally fired rotating drum; or in an electric furnace in which the impregnated particles themselves constitute a resistance element between carbon electrodes. In any case temperatures upward of 600° C., and preferably of the order of 800°–850° C. are used. The optimum temperature is determined to a certain extent by the type of coal which is being processed. A suitable time of treatment is one-half to one hour at or near the maximum temperature.

4—In case the coal possesses coking or swelling properties to an objectionable extent, and is impregnated with the carbonizing agent in advance of treatment to render it non-coking, these properties may be removed or destroyed by calcining, say for several hours at 200°–300° C. preferably with some access of air, and thereafter proceeding with the high temperature calcination as above described. It should be understood that complete removal or destruction of the binding material (bitumen) is not always necessary or even desirable, but the pre-treatment should be such as practically to eliminate all swelling tendency. The desired hard, dense and strong particles cannot be obtained if a material amount of swelling occurs.

5—The calcined product is cooled, leached with water or preferably with dilute acid to effect substantial removal of zinc or other soluble matters, and after drying is ready for use. The properties of the product may however be materially improved by a further activation treatment at high temperatures and under oxidizing conditions, as for example by treatment with superheated steam at 800°–1000° C. The effect of such treatment is substantially to improve the activity of the product, although involving some reduction of the yield.

The specific properties of the product will of course be subject to considerable variation according to the particular raw material chosen and the particular procedure followed. The following data however are fairly representative:

The raw material was a bituminous coal from Utah, and practically "non-coking". It contained 47.10% volatile matter; 45.59% fixed carbon; and 7.31% ash. The fuel ratio (ratio of fixed carbon to volatile matter) was 0.97. The yield of activated carbon from the coal was 66.0%. The activated product had an activity (measured by percent $CCl_4$ absorbed at 25° C. from air saturated at 0° C.) of 55.7%; an apparent density of mass of 8–14 mesh particles of .500; block density (apparent density of particles themselves) of .909; water absorption (measured by percent of liquid absorbed at 25° C.) of 51.3%;

and strength of 98. The strength is measured by the percent by weight of 8–14 mesh particles remaining after shaking 21 cc. of 8–14 mesh carbon for one half hour with 40 steel balls weighing 1 gram each. A product of these characteristics is excellently adapted for general use in the vapor-absorption arts, as for example for the recovery of gasoline from natural gas, solvent recovery and the like. Such a product has a relatively high retentivity, as measured by carbon tetrachloride, say of the order of 20–30 percent.

In the selection of coals adapted for use in accordance with this invention the fuel ratio is a useful index although not an infallible one. Coals having a fuel ratio of the general order of 1.0 are preferred, and this ratio should in all cases be less than 4.0. Anthracitic coals, the fuel ratio of which is upward of 10 or 12, are therefore excluded for the purposes of this invention.

Lignites and lignitic coals present a special problem, as compared with the true coals of the bituminous and sub-bituminous types. They do not coke when heated alone out of contact with air, nor do they swell materially under these conditions. Furthermore they are readily attacked by activating agents, and hence readily activated. Nevertheless the carbon obtained by calcination of impregnated lignites has poor physical properties for absorptive purposes, being relatively weak, porous and soft, as compared with carbons similarly prepared from non-coking coals. The yields moreover are relatively low. I have discovered that by subjecting these lignites and lignitic coals to a preliminary low-temperature treatment of the kind described above (that is to say prolonged calcination under oxidizing conditions at temperatures of the order of 200°–300° C.) or to equivalent treatment with solvents or oxidizing agents, I am enabled to prepare therefrom absorptive carbons essentially similar in physical properties to those obtained from non-coking coals, and moreover with improved yields. Lignites and lignitic coals are therefore to be regarded as equivalent to the non-coking bituminous and sub-bituminous coals in those embodiments of my invention which include such pre-treatment. As with the coals, this pre-treatment may either precede or follow the impregnation, the latter being the preferred procedure.

My process is also directly applicable to such special varieties of coal as the weathered or oxidized bituminous coals which are often designated "rotted coals"; to the so-called "animal carbons"; and in general to all coals and coal-like products which exhibit the essential properties of the non-coking coals, or which are convertible into such by suitable pre-treatment.

Furthermore, I may in some cases employ mixtures of non-coking coals with cellulosic materials, peats, lignites and the like, which are readily activated and in combination with the dense products derivable from the coals yield activated carbons having desirable characteristics for absorptive purposes.

I claim:

1. The process of making granular carbon suitable for the recovery of gases and vapors, which comprises reducing a non-coking coal to granules larger than 20 mesh, impregnating the granules with a carbonizing agent, and calcining the so-treated particles at a temperature above 600° C., the quantity of carbonizing agent used being insufficient to disintegrate the particles on calcination.

2. The process of making granular carbon suitable for the recovery of gases and vapors, which comprises reducing a non-coking coal to granules larger than 20 mesh, impregnating the granules with a carbonizing agent, and calcining the so-treated particles at a temperature above 600° C., the quantity of carbonizing agent used being insufficient to disintegrate the particles on calcination, and then subjecting the so-calcined particles to limited oxidation.

3. Process of making absorbent carbon comprising converting a coking coal to a substantially non-coking condition, and calcining the resulting non-coking product, admixed with a carbonizing agent, at a high temperature.

4. Process of making absorbent carbon comprising converting a coking coal to a substantially non-coking condition, and calcining the resulting non-coking product, admixed with zinc chlorid, at a high temperature.

5. The process of making granular carbon suitable for the absorption and recovery of gases and vapors which comprises comminuting a non-coking coal, impregnating the coal with a carbonizing agent, and calcining the coal at a temperature above 600° C., the quantity of carbonizing agent used being insufficient to disintegrate the coal, and being adapted to produce dense, hard and strong bodies of carbon larger than 20 mesh size.

6. The process of making granular carbon suitable for the absorption and recovery of gases and vapors which comprises comminuting a non-coking coal, impregnating the coal with a carbonizing agent, calcining the coal at a temperature above 600° C., the quantity of carbonizing agent used being insufficient to disintegrate the coal and being adapted to produce dense, hard and strong bodies of carbon larger than 20 mesh size, and subsequently subjecting the calcined material to a limited oxidation.

7. The process of making granular carbon suitable for the absorption and recovery of gases and vapors which comprises comminuting a non-coking coal, impregnating the coal with zinc chlorid, and calcining the coal at a temperature above 600° C., the quantity of zinc chloride used being substantially equal in weight to that of the coal being treated.

8. The process of making granular carbon suitable for the absorption and recovery of gases and vapors which comprises comminuting a coking coal, converting the coking coal to a substantially non-coking condition, impregnating the product with a carbonizing agent, and calcining the same at a temperature above 600° C., the quantity of carbonizing agent used being insufficient to disintegrate the coal, and being adapted to produce dense, hard and strong bodies of carbon larger than 20 mesh size.

9. The process of making granular carbon suitable for the absorption and recovery of gases and vapors which comprises comminuting a coking coal, converting the coking coal to a substantially non-coking condition, impregnating the product with zinc chlorid, and calcining the same at a temperature above 600° C., the quantity of zinc chloride used being substantially equal in weight to that of the coal being treated, and subsequently subjecting the calcined material to a limited oxidation.

10. The process of making granular carbon suitable for the absorption and recovery of gases which comprises comminuting a non-coking coal into a fine powder, impregnating the powdered coal with a carbonizing agent, forming the impregnated coal into compacted masses, calcining the compacted masses at a temperature above 600° C., and sizing the calcined masses to form dense, hard and strong bodies of carbon larger than 20 mesh.

11. The process of making granular carbon suitable for the absorption and recovery of gases which comprises converting a coking coal to a substantially non-coking condition, comminuting the non-coking product into a fine powder, impregnating the powdered coal with zinc chloride, forming the impregnated coal into compacted masses, calcining the compacted masses at a temperature above 600° C., and sizing the calcined masses to form dense, hard and strong bodies of carbon larger than 20 mesh.

12. The process of making absorbent carbon which comprises comminuting a non-coking coal into a fine powder, impregnating the powdered coal with zinc chloride, the amount of zinc chloride used being substantially equal in weight to that of the coal being treated, compressing the impregnated coal into briquettes, calcining the briquettes at a temperature above 600° C., and sizing the calcined briquettes to form dense, hard and strong bodies of carbon of the size desired.

13. The process of making granular absorbent carbon which comprises comminuting a non-coking coal into a fine powder, impregnating the powdered coal with zinc chloride, the amount of zinc chloride used being substantially equal in weight to that of the coal being treated, extruding the impregnated coal into briquettes, calcining the briquettes at a temperature above 600° C., and subsequently subjecting the calcined material to a limited oxidation.

In testimony whereof, I affix my signature.

ARTHUR B. RAY.